United States Patent
Marlatt (10) Patent No.: US 11,240,403 B2
(45) Date of Patent: Feb. 1, 2022

(54) COMPENSATION FOR DELAY IN PTZ CAMERA SYSTEM

(71) Applicant: Avigilon Corporation, Vancouver (CA)

(72) Inventor: Shaun P. Marlatt, North Vancouver (CA)

(73) Assignee: AVIGILON CORPORATION, Vancouver (CA)

(*) Notice: Subject to any disclaimer, the term of this patent is extended or adjusted under 35 U.S.C. 154(b) by 892 days.

(21) Appl. No.: 15/441,572

(22) Filed: Feb. 24, 2017

(65) Prior Publication Data

US 2018/0249047 A1 Aug. 30, 2018

(51) Int. Cl.
*H04N 7/18* (2006.01)
*H04N 5/04* (2006.01)
*H04N 5/232* (2006.01)
*H04N 5/77* (2006.01)
*G06K 9/62* (2006.01)
*G06K 9/32* (2006.01)

(52) U.S. Cl.
CPC ........... *H04N 5/04* (2013.01); *G06K 9/3208* (2013.01); *G06K 9/6202* (2013.01); *H04N 5/23216* (2013.01); *H04N 5/23293* (2013.01); *H04N 5/23296* (2013.01); *H04N 5/23299* (2018.08); *H04N 5/232061* (2018.08); *H04N 5/77* (2013.01); *H04N 7/183* (2013.01)

(58) Field of Classification Search
CPC .. H04N 5/04; H04N 5/23206; H04N 5/23216; H04N 5/77; H04N 7/183; G06K 9/00771; G06K 9/46; G06K 2009/4666

USPC .............. 348/143, 169, 218.1; 382/173
See application file for complete search history.

(56) References Cited

U.S. PATENT DOCUMENTS

| | | | |
|---|---|---|---|
| 6,574,353 B1 * | 6/2003 | Schoepflin | G06K 9/6206 348/169 |
| 7,643,066 B2 | 1/2010 | Henninger et al. | |
| 8,405,720 B2 | 3/2013 | Gupta et al. | |
| 9,420,187 B2 | 8/2016 | Neufeld et al. | |
| 2002/0118875 A1* | 8/2002 | Wilensky | G06T 7/12 382/173 |
| 2009/0262206 A1* | 10/2009 | Park | G08B 13/19641 348/218.1 |
| 2016/0117821 A1* | 4/2016 | Oh | G06T 7/33 382/190 |
| 2016/0191858 A1* | 6/2016 | Bekiares | H04N 7/181 348/143 |

OTHER PUBLICATIONS

Matheson et al., "The Effects of Predictive Displays on Performance in Driving Tasks with Multi-Second Latency: Aiding Tele-Operation of Lunar Rovers"; Proceedings of the Human Factors and Ergonomics Society 57th Annual Meeting; 2013; 5 pages.

Burger, Thomas, "How Fast is Realtime? Human Perception and Technology"; dated Feb. 9, 2017; https://www.pubnub.com/blog/2015-02-09-how-fast-is-realtime-human-perception-and-technology/; 9 pages.

* cited by examiner

Primary Examiner — Jayanti K Patel
Assistant Examiner — Richard B Carter
(74) Attorney, Agent, or Firm — Perry + Currier, Inc.

(57) ABSTRACT

Compensating for delay in a Pan-Tilt-Zoom (PTZ) camera system is disclosed. Client-side view transformation is carried out to emulate a future Field Of View (FOV) of the camera so that the impact of latency is reduced.

19 Claims, 7 Drawing Sheets

COMPENSATION FOR DELAY IN PTZ CAMERA SYSTEM

FIELD

The present subject-matter relates to compensating for delay in a Pan-Tilt-Zoom (PTZ) camera system and, in particular, to an apparatus and method for reducing latency impact by emulating future video frames expected to be received from the PTZ camera system.

BACKGROUND

Many PTZ cameras have automatic tracking capability. While useful, there are limitations on automatic tracking. For instance, support from the cameras themselves is required and automatic tracking is limited to only certain types of objects. Manual tracking (human controller involvement) is therefore needed in a number of applications where automatic tracking is deemed to be insufficient (or not suitable).

SUMMARY

According to one example embodiment, there is provided a method carried out on a computer terminal that includes a display and at least one input device, and where the computer terminal is in communication with a Pan-Tilt-Zoom (PTZ) camera device over at least one network. The method includes receiving user input provided through the input device and generating a command, which is specific to the user input and that defines a camera movement for making a change in a Field Of View (FOV) of the PTZ camera device. The method also includes transmitting the command, destined to be received by the PTZ camera device and to effect eventual camera movement thereof, over the at least one network. In a period of time overlapping with the transmitting of the command, video frames are locally transformed to emulate future video frames produced, post-command execution, by the PTZ camera device. The method also includes displaying the locally transformed frames on the display of the computer terminal. The method also includes repeatedly checking frames, received at the computer terminal via the at least one network, until a determination is made that a newly received frame indicates that the local transforming of the video frames is no longer needed.

According to another example embodiment, there is provided an apparatus that includes a computer terminal configured to communicate with a Pan-Tilt-Zoom (PTZ) camera device over at least one network. The computer terminal includes at least one input device to receive input from a user of the computer terminal. The computer terminal also includes communication circuitry configured to transmit a command, destined to be received by the PTZ camera device and to effect eventual camera movement thereof, over the at least one network. The computer terminal also includes a processor configured to: i) generate the command, specific to the user input, that defines a camera movement for making a change in a Field Of View (FOV) of the PTZ camera device; ii) in a period of time overlapping with transmission of the command by the communication circuitry, locally transforming video frames to emulate future video frames produced, post-command execution, by the PTZ camera device; and iii) repeatedly checking frames, received at the computer terminal via the at least one network, until a determination is made that a newly received frame indicates that the local transforming of the video frames is no longer needed. The computer terminal also includes a display configured to display the locally transformed frames.

According to yet another example embodiment, there is provided a method carried out on a computer terminal that includes a display and at least one input device, and where the computer terminal is in communication (over at least one network) with at least two camera devices, including at least one Pan-Tilt-Zoom (PTZ) camera device. The method includes receiving user input provided through the input device and determining that the user input specifies a command that defines a camera movement for changing a Field Of View (FOV) of the PTZ camera device from a current FOV to a future FOV. The future FOV includes an FOV region not a part of the current FOV but covered by a current FOV of another of the at least two camera devices. The method also includes emulating a future video frame corresponding to the future FOV of the PTZ camera device by mosaicking image data from the PTZ camera device with image data from the another of the at least two camera devices. The method also includes displaying the emulated future video frame on the display before any video frames corresponding to the future FOV as generated by the PTZ camera device, post-command execution, are available to the computer terminal.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

The term "placeholder" as used herein (for example, placeholder pixels area or placeholder data) refers to substitute pixel data (like a monochromatic fill-in) for completing gap regions (missing image data regions) in a transformed video frame.

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to embodiments of the invention. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block(s).

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block(s).

Figure 1:
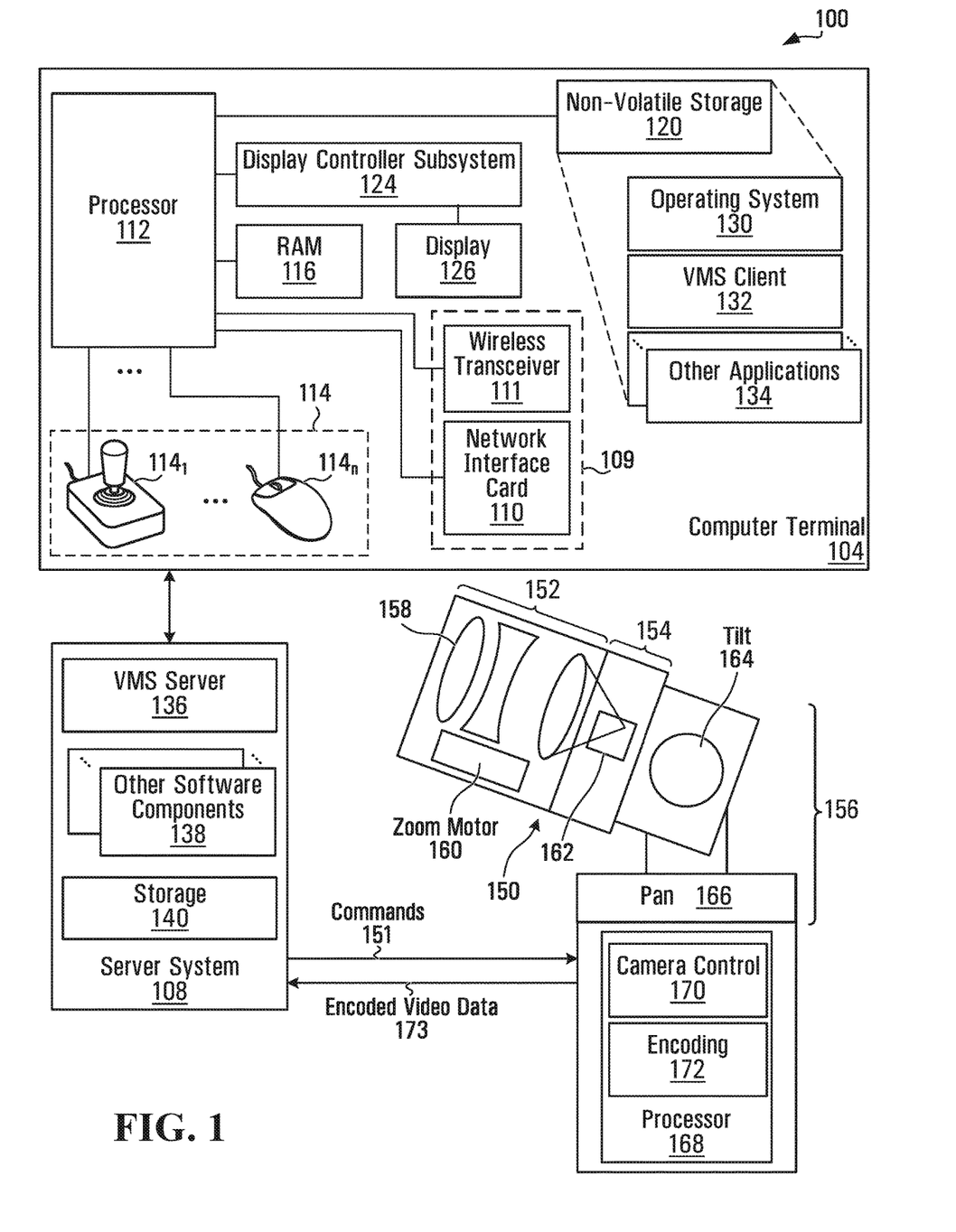
FIG. 1 shows a block diagram of an example surveillance system within which methods in accordance with example embodiments can be carried out.

Reference is now made to FIG. 1 which is a block diagram of a surveillance system 100 in accordance with example embodiments. The illustrated surveillance system 100 includes a server system 108 which could comprise a single physical machine or multiple physical machines. It will be understood that the server system 108 need not be contained within a single chassis, nor necessarily will there be a single location for the server system 108.

Also included within the illustrated surveillance system 100 are one or more computer terminals 104 (just one is shown for convenience of illustration). In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices.

The computer terminal 104 includes one or more communication circuitries 109 for communicating with other network-connected devices including, for example, the server system 108. This communicating is carried out through one or more networks including, for example, the Internet and/or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). With respect to wired communications, the computer terminal may employ, for example, a network interface card 110. With respect to wireless communications, the computer terminal may employ, for example, a wireless transceiver 111. In at least one example embodiment, the computer terminal 104 and the server system 108 are within the same Local Area Network (LAN).

The computer terminal 104 includes at least one processor 112 that controls the overall operation of the computer terminal 104. The processor 112 interacts with various subsystems such as, for example, input devices $114_1$-$114_n$ (such as a selected one or more of a keyboard, joystick, mouse, touch pad, roller ball, regions of display 126 and voice control means, for example), random access memory (RAM) 116, non-volatile storage 120, display controller subsystem 124 and other subsystems [not shown]. The display controller subsystem 124 interacts with display 126 and it renders graphics and/or text upon the display 126. The display 126 may be in the same housing or enclosure as the computer terminal 104, or it may be separate in its own housing or enclosure. In accordance with at least one example embodiment, the display 126 is a touchscreen display with region(s) that function as an input device.

Still with reference to the computer terminal 104 of the surveillance system 100, operating system 130 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 130, this includes software that manages computer hardware and software resources of the computer terminal 104 and provides common services for computer programs. Also, those skilled in the art will appreciate that the operating system 130, Video Management System (VMS) client application 132, and other applications 134, or parts thereof, may be temporarily loaded into a volatile store such as the RAM 116. The processor 112, in addition to its operating system functions, can enable execution of the various software applications on the computer terminal 104. Regarding the VMS client application 132, when it is run on the computer terminal 104 it enables a computer terminal user to carry out various traditional functions, including camera control and video viewing functions, that one skilled in the art would expect such a computer application to provide. Additionally the VMS client application 132 provides certain novel functions described in more detail below. Regarding the other applications 134, these can include any number of various known applications typically found on commercially available computing devices (for example, the other applications 134 may include a web browser application, which one skilled in the art will understand is a program used to view, download, upload, surf, and/or otherwise access any of various types of documents typically found on the web).

The server system 108 includes software components for carrying out functions of the server system 108. For example, the server system 108 includes a VMS server 136. The VMS server 136 carries out various functions and tasks which will be understood by those skilled in the art including, for example, handling requests from the VMS client application 132 related to transmission, storage and retrieval of video taken by cameras within the surveillance system 100. The server system 108 also includes a number of other software components 138. These other software components will vary depending on the requirements of the server system 108 within the overall system 100. As just one example, the other software components 138 might include special test and debugging software, or software to facilitate version updating of modules within the server system 108. The server system 108 also includes one or more data stores 140.

Still with reference to FIG. 1, the illustrated surveillance system 100 also includes a PTZ camera device 150. The PTZ camera device 150 is in communication with the server system 108 (for example, commands 151 and other signals can be communicated therebetween). The PTZ camera device 150 includes a lens system 152 capable of zooming in and out and camera electronics 154 for capturing images. The camera electronics 154 include an image sensor 162 as well as other circuitry required by the image sensor 162. The illustrated PTZ camera device 150 further includes a mounting platform 156 that is capable of repositioning the direction with respect to which the camera is pointed. Although depicted as being provided by pan and tilt motors, the PTZ camera device 150 may provide pan and tilt positioning of the displayed field of view in other ways.

The lens system 152 includes a number of optical elements that can be repositioned by a zoom and/or focus motor 160. Changing the position of individual optical elements results in a magnification of the image, either zooming in or zooming out. However, if as depicted in FIG. 1 the image sensor 162 and the optical axis of the lens 152 are misaligned, the zoomed-in image will be offset from a desired or expected location.

The mounting platform 156 may include a tilt motor 164 and a pan motor 166. The tilt motor 164 may adjust the positioning of the camera along a first axis, while the pan motor 166 may adjust the positioning of the camera along a second axis, which may be orthogonal to the first axis. For example, the tilt motor 164 may adjust a vertical direction of the camera and the pan motor 166 may adjust a horizontal direction of the camera. Although depicted as pan and tilt motors, it is contemplated that other motors may be used in adjusting the positioning of the camera.

The PTZ camera device 150 may further include a processor or microcontroller 168. Certain modules including a camera control module 170 and an encoding module 172 are implemented within the processor or microcontroller 168. Regarding the camera control module 170, this processes commands 151 received by the PTZ camera device 150 from the server system 108 (it will be understood that the server system 108 can be located remote or local relative to the PTZ camera device 150). Regarding the encoding module 172, this encodes video generated within the PTZ camera device 150 so that video may be suitably transmitted and stored within the surveillance system 100.

Figure 2:
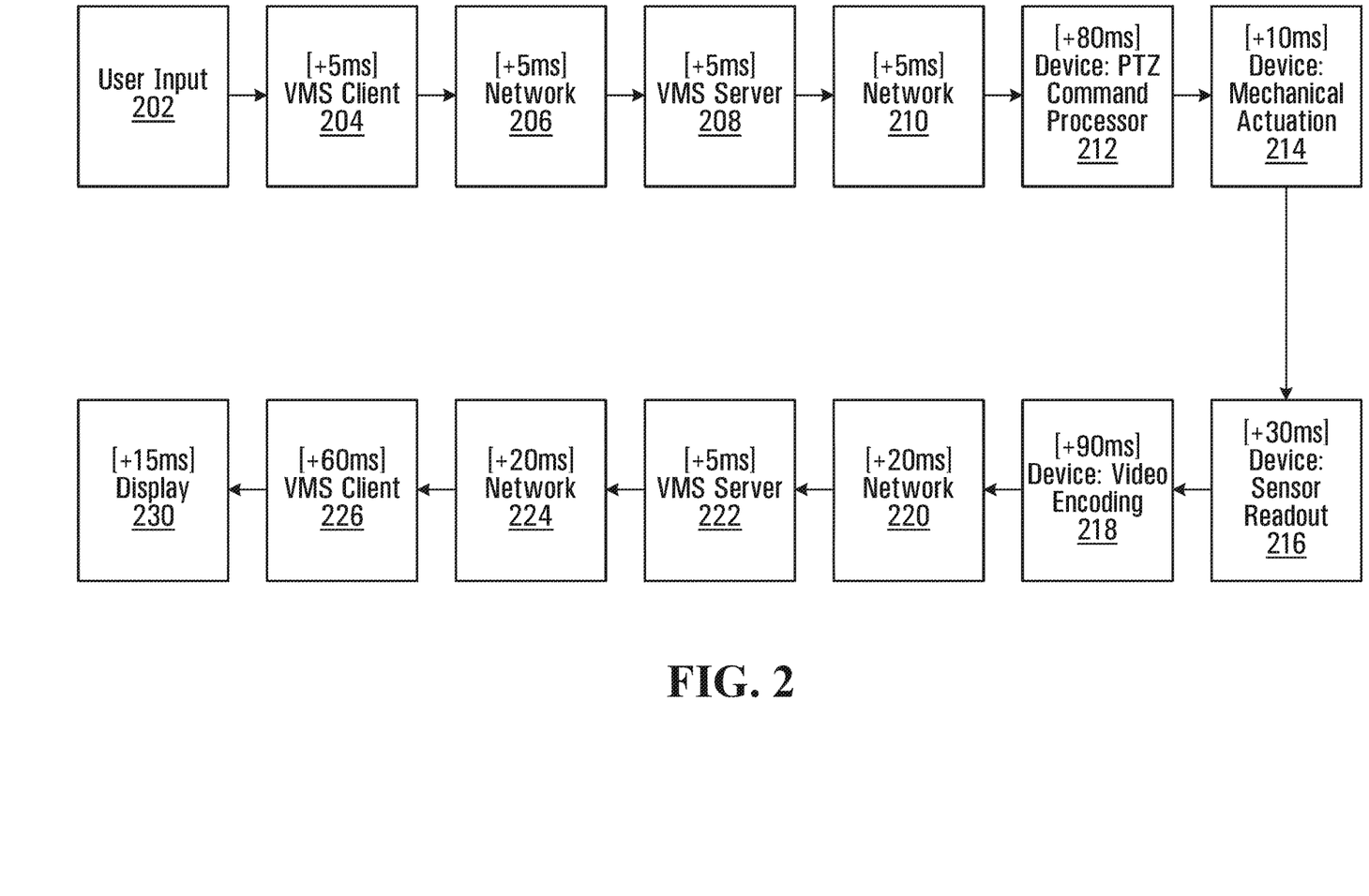
FIG. 2 diagrammatically illustrates example delays within the example surveillance system shown in FIG. 1.

FIG. 2 is a diagram that provides an illustrative breakdown of the network latency, within the surveillance system 100 shown in FIG. 1, by showing example rough approximations of latency components forming overall latency within the surveillance system 100 (i.e. in numerous different examples, various delays will be higher or lower than illustrated based on a variety of factors, and therefore precise or exact delays amounts are not needed to understand example embodiments). More specifically, FIG. 2 shows the example delays incurred from operator input at block 202 to eventual update of the corresponding movement on the client display at block 230. With regards to arrows shown in FIG. 2, these illustrate transition in time from one component of latency to the next. With reference to both FIGS. 1 and 2, these illustrated delays are explained in more detail below.

Regarding the operator input at block 202, this could correspond to, for example, an operator at the computer terminal 104 initiating a command by interaction with a User Interface (UI) generated on the display 126. When a control signal from a user input device is received and processed within the VMS client 132, this incurs an associated delay (5 ms in the illustrated example) which is shown as block 204. The next delay incurred is shown as block 206, which corresponds to a generated command being communicated from the computer terminal 104 to the server system 108 over the network to which both may belong. The incurred delay at the block 206 of the illustrated example is 5 ms. Those skilled in the art will appreciate that TCP may be involved here to allow repeating of the command data if packet loss occurs.

Next, receiving and processing of the command within the VMS server 136 of the server system 108 incurs an associated delay which is shown as block 208. This incurred delay is 5 ms in the illustrated example.

The next delay incurred (5 ms in the illustrated example) is shown as block 210, corresponding to the command being communicated from the server system 108 to the PTZ camera device 150 over the network to which both may belong. Those skilled in the art will appreciate that TCP may be involved here to allow repeating of the command data if packet loss occurs. This command is then received and processed within the camera control module 170 of the PTZ camera device 150 incurring an associated delay (80 ms in the illustrated example) which is shown as block 212. The delay is significant here because ONVIF® XML processing is assumed for the purpose of the present example and, additionally, it is assumed that some sufficient spacing of commands is provided for so that the processor 168 of the PTZ camera device 150 is provided proper command time margins from one received command to the next. Next, the command is executed within the PTZ camera device 150 and there is a delay associated with the movement specified by the command (i.e. actuation of the zoom motor 160, tilt motor 164 and/or pan motor 166 to effect movement). This delay (10 ms in the illustrated example) is shown as block 214 in FIG. 2.

The next delay incurred is shown as block 216, which corresponds to time elapsed between when light is captured at the image sensor 162 to when it is transformed into the recorded image data that is read out. For this illustrated example, the incurred delay here is 30 ms. Next, the encoding module 172 in the PTZ camera device 150 encodes the new video which incurs an associated delay which is shown as block 218. The delay (90 ms in the illustrated example) is significant and caused by the nature of the encoding being such that the duration spans over multiple frames, which is because it is carried out in a pipelined manner.

The next delay incurred is shown as block 220, which corresponds to encoded video data 173 being communicated from the PTZ camera device 150 to the server system 108 over the network to which both may belong. The incurred delay is significant (20 ms in the illustrated example) because, for instance, additional cameras and/or other devices share the available network bandwidth, so the encoded video data 173 is deliberately not sent at the maximum transmission speed, but rather transmission is spread out over a time interval of one video frame in order to facilitate management of the network bandwidth resource. Those skilled in the art will be aware of priority mode schemes to permit increased transmission speed; however these schemes may have issues related to loss of packets of the video data.

Next, the received video data is processed by the VMS server 136 in the server system 108 incurring an associated delay which is shown as block 222. This incurred delay is 5 ms in the illustrated example.

The next delay incurred is shown as block 224, which corresponds to video data being communicated from the server system 108 to the computer terminal 104 over the network to which both may belong. The incurred delay is significant (20 ms in the illustrated example) because again the video data is not sent to the computer terminal 104 at the maximum transmission speed, but rather transmission is spread out over a time interval of one video frame in order to facilitate management of the network bandwidth resource.

The received video data is then processed by the VMS client 132 in the computer terminal 104 incurring an associated delay which is shown as block 226. It will be noted that the delay of 60 ms, for this example, includes the delay of the video graphics card (for example, decoding). The delay here is significant because the nature of the decoding on the graphics card is such that it is performed in stages (duration spans over multiple frames).

Finally, there is another delay (15 ms in the illustrated example) shown as block 230. This final delay amount is associated with creation of the visually perceivable next frame on the display 126 of the computer terminal 104. In other words, this is the delay which starts when the video signal is received at the display 126 and ends when the actual drawing of the image occurs. In this example, a monitor refresh rate of 60 Hz is assumed.

Thus, the user inputted command passes through multiple components that contribute to overall latency on the upstream path. Similarly video data constituting the image from the sensor readout passes back through the same components before it reaches the user. In FIG. 2, the overall loop latency is on the order of 350 ms, which is fairly typical for IP systems where only a LAN is involved. As already previously alluded to, various examples delays shown and described in connection with FIG. 2 will become higher or lower when some change is made in any one of a variety of different delay-impacting variables (for example, a change in the frame rate of the video transmitted from the PTZ camera device 150 will change delay with respect to each of the blocks 216, 218, 220 and 224). Also, if the example of FIG. 2 is modified such that the upstream and downstream paths include both a LAN and a Wide Area Network (WAN), like the Internet, then overall loop latency may be greater (such as, for example, on the order of 450 ms). Regarding the overall loop latency, human perception is such that latencies less than 200 ms are generally not perceivable; however latencies of the amount described above are capable of being perceived and may contribute to operator fatigue. Rather than seeing that a tracked object only moves after a delay has elapsed, it is better for the operator to perceive immediate movement of the object he or she is tracking.

Figure 3:
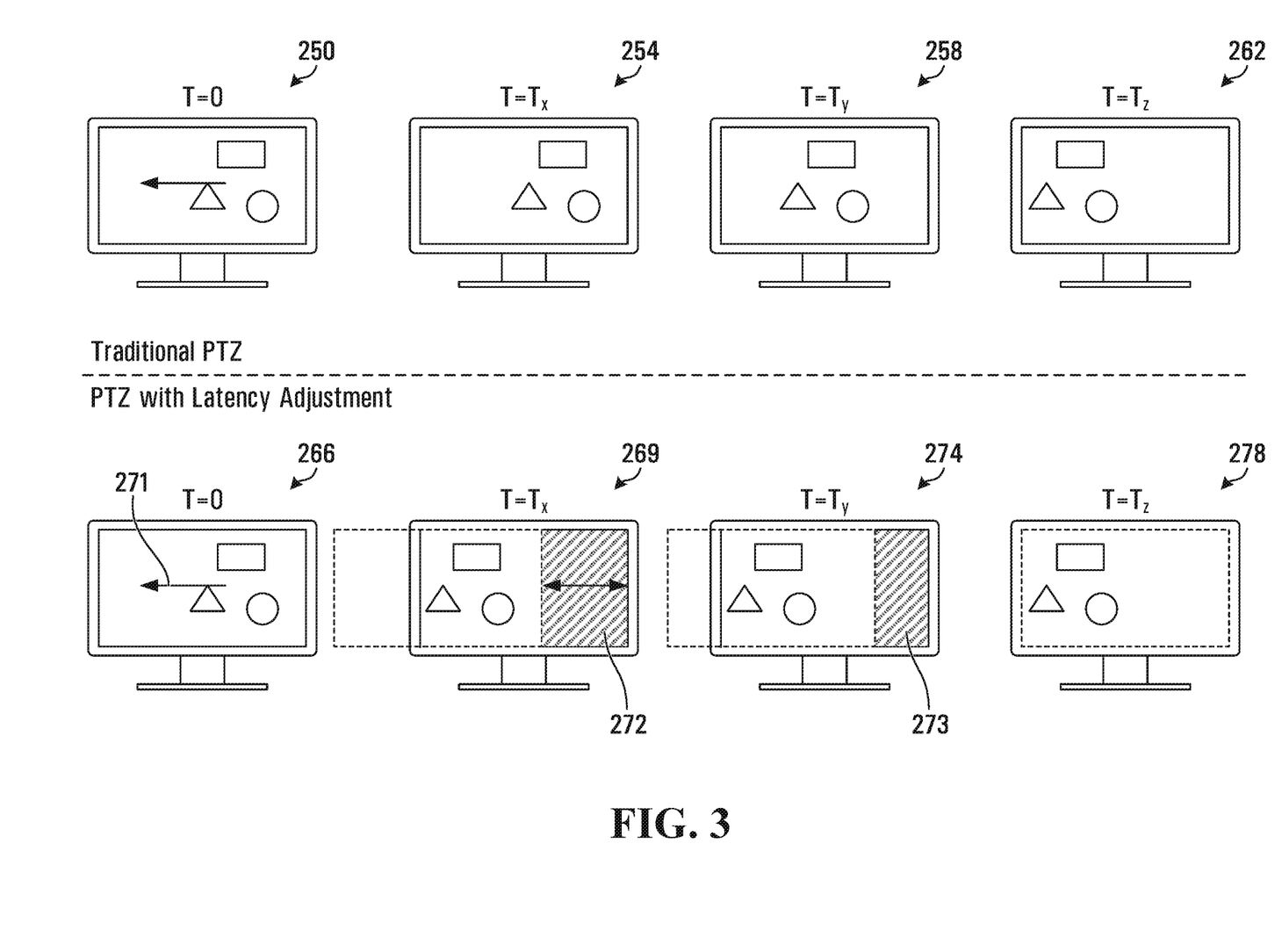
FIG. 3 is a diagram comparing example display screen images at various instances in time, the upper half of the diagram showing display screen images for a traditional system and the lower half of the diagram showing display screen images for a system in accordance with example embodiments.

FIG. 3 is a diagram comparing display screen images at various instances in time, where the upper half of the diagram is showing screen images displayed within a traditional system, and where the lower half of the diagram is showing screen images displayed within a system in accordance with example embodiments. Displayed video frames 250 and 266 are what the computer terminal user sees at the instant in time that the computer terminal user actuates an input device providing input to generate a command that defines a camera movement to change the FOV of the PTZ camera device 150. Displayed video frames 254 and 269 are what the computer terminal user sees at time $T_x$ (for example, 60 ms after the computer terminal user actuates the input device). Displayed video frames 258 and 274 are what the computer terminal user sees at time $T_y$ (for example, 260 ms after the computer terminal user actuates the input device). Displayed video frames 262 and 278 are what the computer terminal user sees at time $T_z$ (for example, 290 ms after the computer terminal user actuates the input device). Regarding the above-stated elapsed time amounts, these are not intended to be precise or exact delays amounts, since such is not needed to understand example embodiments (i.e. for similar reasons as was previously discussed in connection with the delay time values appearing in FIG. 2). Further discussion concerning FIG. 3 is provided later below alongside a discussion of FIG. 4.

Figure 4:
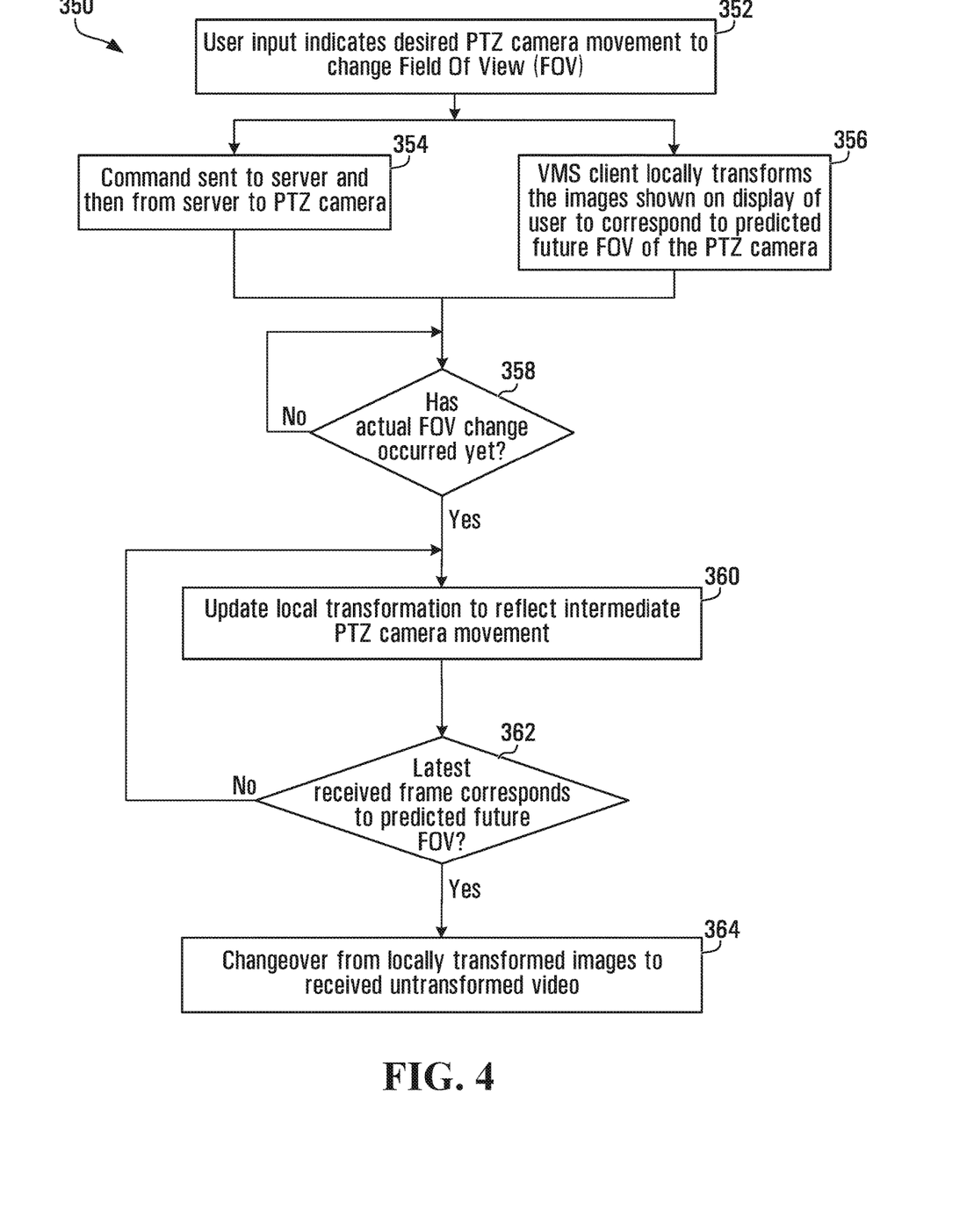
FIG. 4 is a flow chart illustrating a client-side view transformation method in accordance with an example embodiment.

FIG. 4 is a flow chart of a method 350 in accordance with an example embodiment. As a first action (352) in the illustrated method 350, a user provides input (for example, actuating one of the input devices 114 shown in FIG. 1) that indicates a desired PTZ camera movement (for example, the user input is recognized by the VMS client 132 as a PTZ camera movement request) to change a Field Of View (FOV) of a PTZ camera (for example, the FOV of PTZ camera device 150 shown in FIG. 1). Next the method 350 includes two actions which occur in overlapping time periods: 1) sending a command (354) to a server (for example, from the computer terminal 104 to the server system 108 shown in FIG. 1) and then from the server to the PTZ camera; and 2) locally transforming (356) images shown on a display (for example, the display 126 shown in FIG. 1) of the user to correspond to predicted (calculated) future FOV of the PTZ camera (for example, the displayed video frame 269 in FIG. 3 is locally transformed, this transformation including a leftwards translation, corresponding to arrow indicator 271, of the original pixels and a filling in with a placeholder pixels area 272 like, for example, a monochromatic fill-in). This local transformation may be carried out by the VMS client application 132. Next there is checking (358) whether an incoming latest video frame received at the computer terminal indicates that an actual FOV change has occurred. If 'YES', then next is action 360. If 'NO', then the checking (358) is repeated at a next point in time (for example, when the next video frame after the current one is received).

For the action 360, the locally transformed image is updated to reflect the intermediate PTZ camera movement. For example, the displayed video frame 274 at time $T_y$ in FIG. 3 is updated as compared to the displayed video frame 269 at earlier time $T_x$. In this regard, it will be noted that placeholder pixels area 273 is visibly reduced in size as compared to the placeholder pixels area 272 in the earlier video frame. Thus, the displayed video frame 274 corresponds to image data obtained at a point in time where the PTZ camera is in a partly moved position, somewhere in-between the initial and final positions of a defined pan, tilt and/or zoom movement.

Next there is checking (362) whether an incoming latest video frame received at the computer terminal indicates an FOV of the PTZ camera for that latest frame corresponding to the predicted future FOV that was determined at the action 356. If 'YES' the VMS client application 132 registers that emulated video frames are no longer needed and action 364 occurs, namely there is changeover from the transformed images to the untransformed video received at the computer terminal 104. For example, the displayed video frame 278 at time $T_z$ in FIG. 3 reflects and coincides with the action 364.

Figure 5:
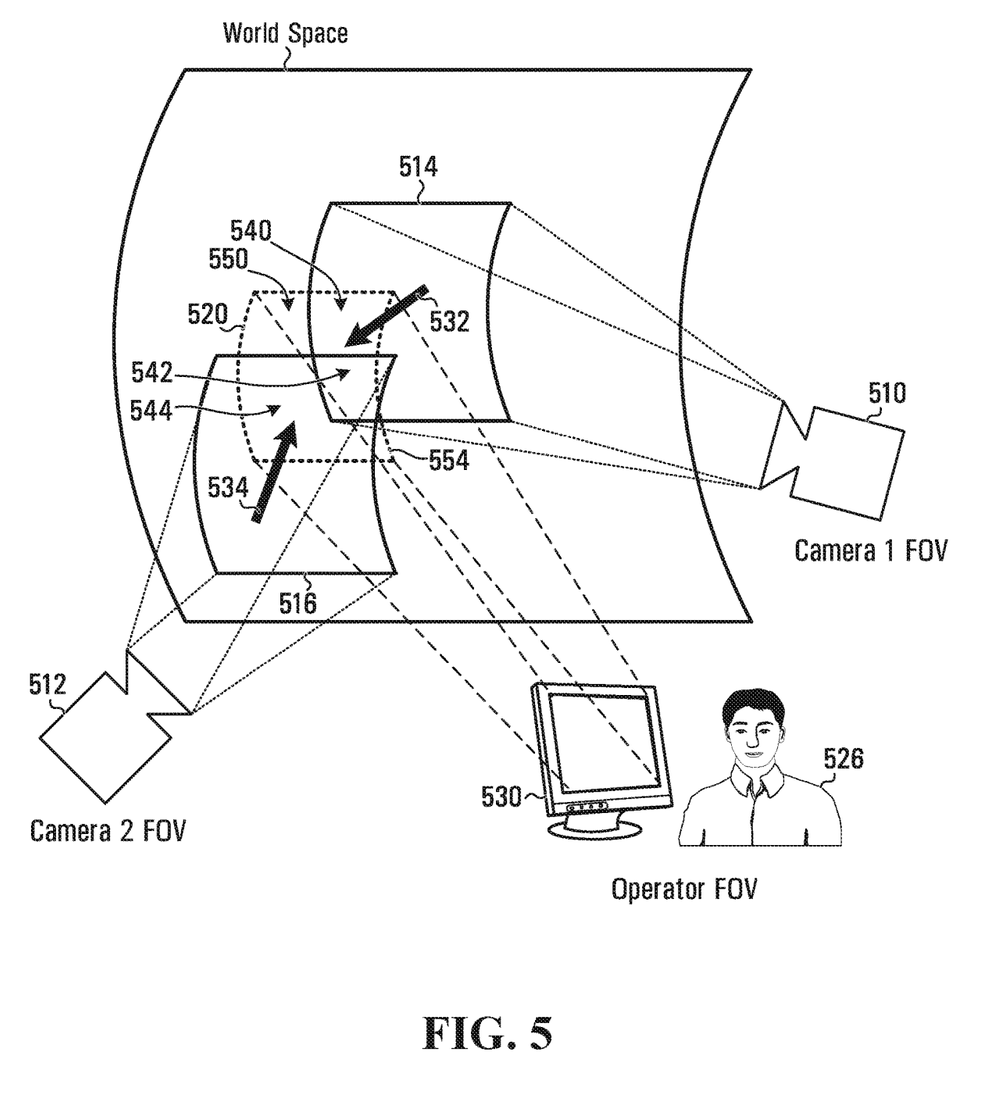
FIG. 5 is a diagram illustrating use of two PTZ camera devices for client-side view transformation in accordance with an example embodiment.

Reference will now be made to FIG. 5. FIG. 5 is a diagram illustrating use of two PTZ camera devices 510 and 512 for client-side view transformation in accordance with an example embodiment. Although two camera devices are shown for the convenience of illustration, alternative examples are contemplated where there may be any number of PTZ camera devices (for example, three devices, four devices, etc.) cooperating together in a manner similar to what is described below. Also, a plurality of mixed-type camera devices is also contemplated. For example, one or more wide FOV camera devices may be employed in combination with one or more PTZ camera devices.

A first geometric shape 514 shown in FIG. 5 is in solid lines and represents a current FOV for the PTZ camera device 510. A second geometric shape 516 is also in solid lines and represents a current FOV for the PTZ camera device 512. A third geometric shape 520 is in dashed lines and represents a desired area of "World Space" that operator 526 would like to have the PTZ camera devices 510 and 512 pointed at so that he can view video frames on display 530 that include that defined region.

In the illustrated example, the two PTZ camera devices 510 and 512 are concurrently issued commands that define camera movement (as noted by arrows 532 and 534). The FOV of the PTZ camera device 510 is to be moved by an amount and direction corresponding to the length and direction of the arrow 532. The FOV of the PTZ camera device 512 is to be moved by an amount and direction corresponding to the length and direction of the arrow 534.

Similar to previously described example embodiments, the impact of latency can be reduced by local transformation of video frames; however here mosaicking of portions of video frames from both of the two PTZ camera devices 510 and 512 may produce a more complete emulation of the future video frames than carrying out a local transformation using video frames from a single camera device. This is because mosaicking will result in transformed video frames that include each of the following regions: region 540 (covered by the camera device 510), region 542 (covered by both of the camera devices 510 and 512) and region 544 (covered by the camera device 512). The need for placeholder data to complete the transformed video frames is reduced with mosaicking since it is only needed for region 550 and for the small region at corner 554 of the geometric shape 520. Also, as the FOVs of the PTZ camera devices 510 and 512 are moved in the directions of the arrows 532 and 534, they become closer together and the placeholder data regions shrink.

The above described mosaicking to produce transformed video frames applies to alternative examples where instead of the two PTZ camera devices 510 and 512 there is some other combination of cameras. For example, if there is one PTZ camera and one wide FOV camera, transformed video frames can be assembled as much as possible from higher resolution image data from the PTZ camera with remaining frame regions obtained from wide FOV camera (lower resolution image data).

Figure 6:
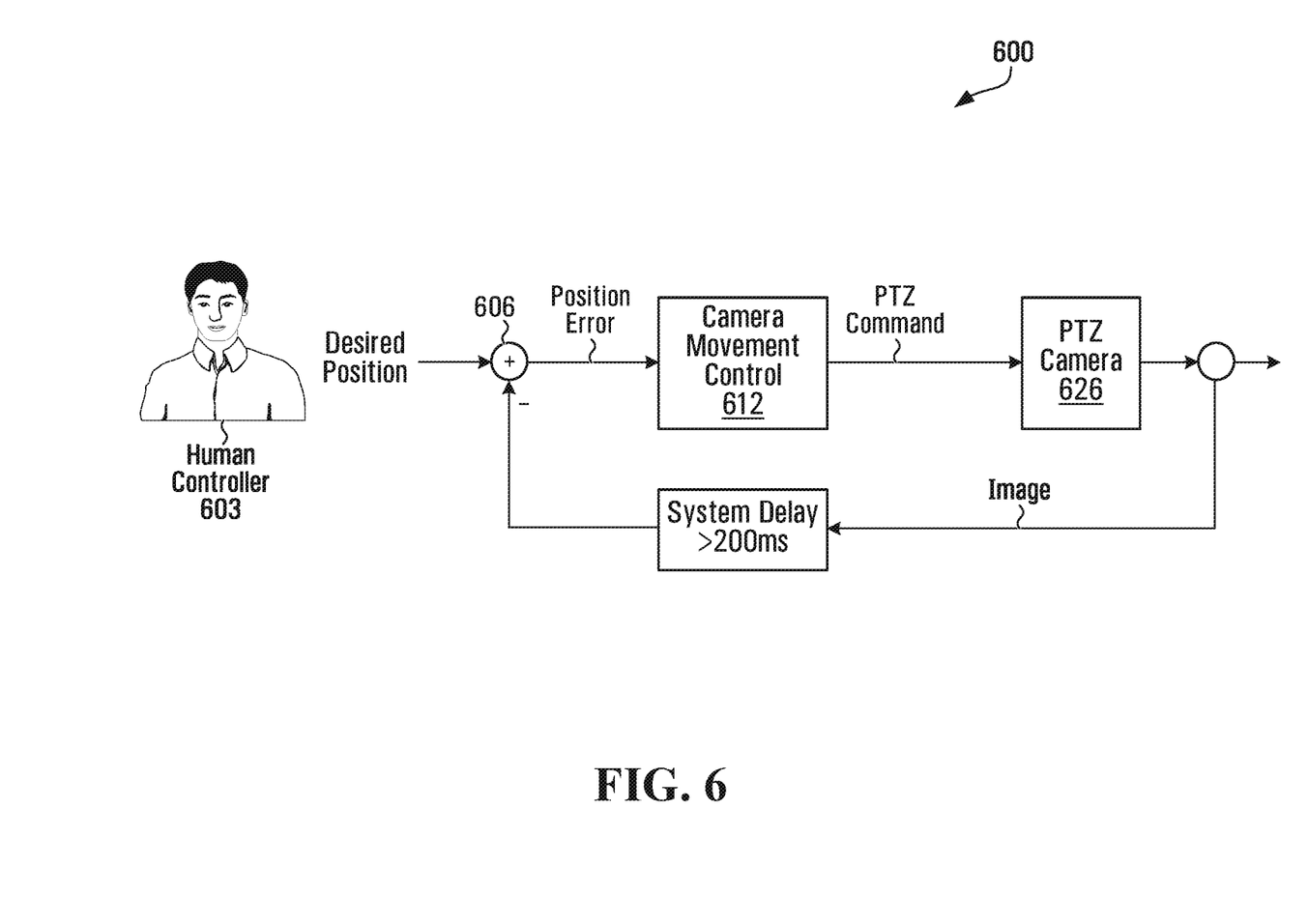
FIG. 6 is a diagram illustrating a traditional control loop in a PTZ camera system.

Reference will now be made to FIG. 6. FIG. 6 is a diagram illustrating a traditional control loop 600 in a PTZ camera system. In the control loop 600, human controller 603 provides input into comparator 606 that indicates a desired PTZ camera movement. Feedback (outputted video frame of PTZ camera 626) is also fed to the comparator 606 and the comparator 606 calculates a "position error" (difference) between the desired camera position and the camera position corresponding to the feedback. In some examples, this position error can be calculated by measuring a distance, as between two video frames, for pairs of same points identifiable in objects found in the video frames. PTZ metadata, produced by the PTZ camera device, can also be employed in calculating the position error. As yet another alternative, some examples may employ a hybrid scheme for position error calculation. For instance, a PTZ camera device may send positional data (PTZ metadata) that is not precise to a pixel-level granularity; however the sent positional data may have some known error bound(s). Thus the positional data permits reduced local computation by for example, the VMS client 132 (FIG. 1). In this regard, the reduced local computation may only involve searching for corresponding points within the error bound(s) rather than search across an entire frame of a video for corresponding points.

Still with reference to FIG. 6, the calculated position error is then inputted into camera movement control 612 which generates a PTZ movement command which is provided to (and specifies a movement for) the PTZ camera 626. Thus, the PTZ camera 626 is caused to move when there is a position error between the desired camera position and the camera position corresponding to the feedback. Eventually the PTZ camera 626 moves to the point where the position error becomes reduced to zero and the PTZ camera 626 then becomes stationary until some later point in time where the human controller 603 once again desires a new camera position by providing new input to the comparator 606.

Figure 7:
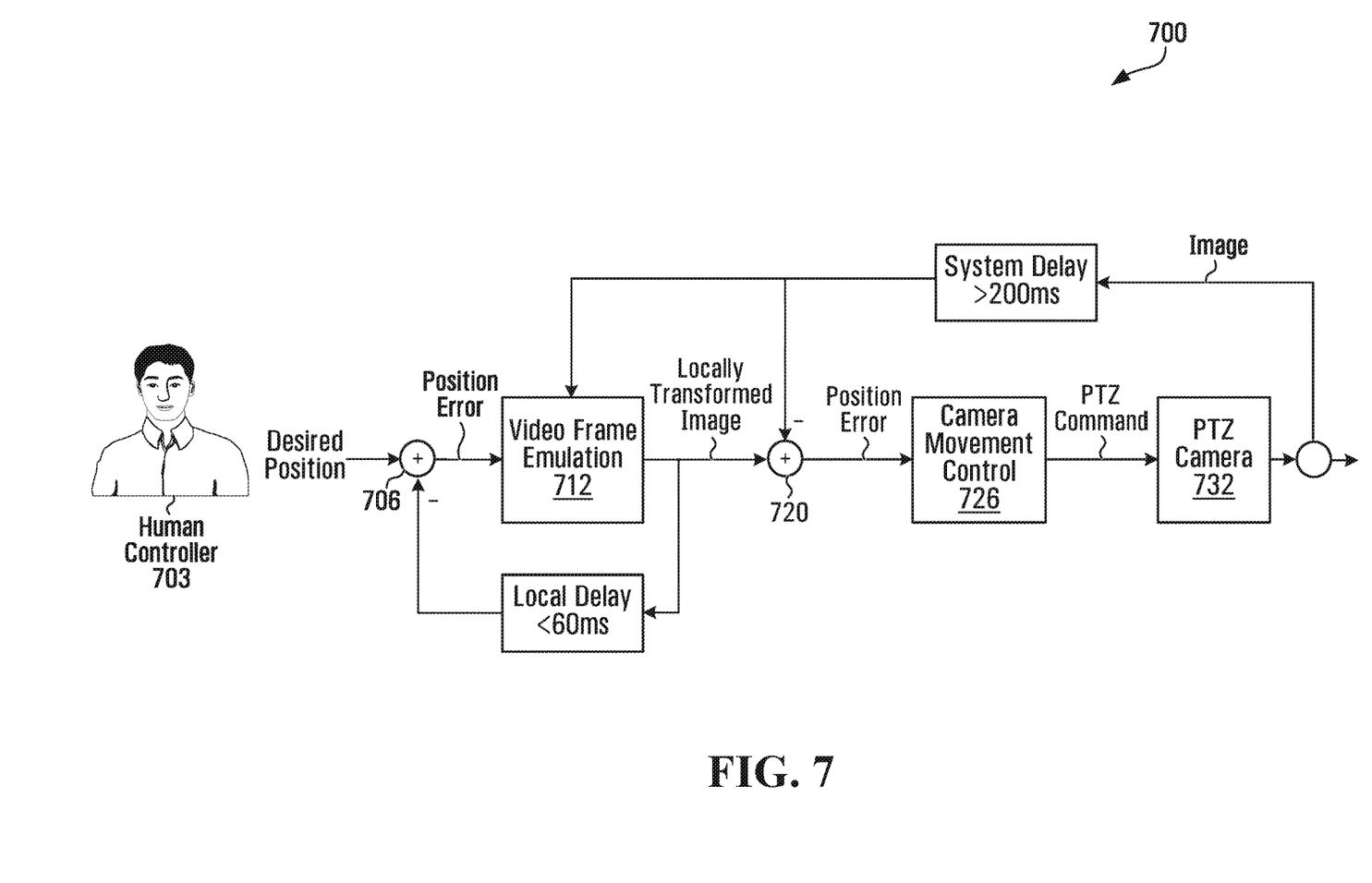
FIG. 7 is a diagram illustrating a control loop in a PTZ camera system in accordance with example embodiments.

In contrast to the traditional control loop 600 illustrated in FIG. 6, FIG. 7 is a diagram illustrating a control loop 700 in a PTZ camera system in accordance with example embodiments. Here there is a comparator 706 somewhat similar to the comparator 606 described previously; however the outputted position error of the comparator 706 is not directly inputted into camera movement control 726, but is instead received by video frame emulation 712 local to the human controller 703. Also the video frame emulation 712 generates a locally transformed video frame which is fed back to the comparator 706 with much less delay than as compared to the feedback to the comparator 606.

Still with reference to the control loop 700, the locally transformed image outputted from the video frame emulation 712 is inputted to a second comparator 720. Feedback (outputted video frame of PTZ camera 732) is also fed to the second comparator 720 and the comparator 720 calculates a "position error" (difference) between the camera position corresponding to the locally transformed image and the camera position corresponding to the feedback. The calculated position error outputted from the second comparator 720 is then inputted into the camera movement control 726 which generates a PTZ movement command which is provided to (and specifies a movement for) the PTZ camera 732.

Certain adaptations and modifications of the described embodiments can be made. For example, monochromatic fill-in has been described as one example of placeholder data that can be used for completing gap regions in a transformed video frame. Other examples of suitable placeholder or fill-in data may include stored stale image data, pieces of 360 degree image data taken by pan movement (entire rotation of the PTZ camera) during some stage of initialization (for example, awakening from a sleep state), and image data from an additional camera (such as, for example, a fisheye camera or panoramic camera).

Therefore, the above discussed embodiments are considered to be illustrative and not restrictive, and the invention should be construed as limited only by the appended claims.

The invention claimed is:

1. A method carried out on a computer terminal that includes a display and at least one input device, the computer terminal in communication with a Pan-Tilt-Zoom (PTZ) camera device over at least one network, and the method comprising:
   receiving user input provided through the input device;
   generating a command, specific to the user input, that defines a camera movement for making a change in a Field Of View (FOV) of the PTZ camera device;
   transmitting the command, destined to be received by the PTZ camera device and to effect eventual camera movement thereof, over the at least one network;
   in a period of time overlapping with the transmitting of the command, locally transforming video frames to emulate future video frames produced, post-command execution, by the PTZ camera device, wherein local transformation of the video frames is done without using the future video frames being emulated;
   displaying the locally transformed frames on the display of the computer terminal; and
   repeatedly checking frames, received at the computer terminal via the at least one network, until a determination is made that a newly received frame indicates that the local transforming of the video frames is no longer needed.

2. The method as claimed in claim 1 wherein the display is a touchscreen display and the input device is one or more defined regions of the touchscreen display.

3. The method as claimed in claim 1 wherein the video frames being locally transformed do not include image data for certain defined regions in the future video frames being emulated, and the local transforming of the video frames includes inserting placeholder data into the defined regions.

4. The method as claimed in claim 1 wherein the at least one network is a single local area network.

5. The method as claimed in claim 1 wherein the at least one network includes a local area network and a portion of the Internet.

6. Apparatus comprising:
   a computer terminal configured to communicate with a Pan-Tilt-Zoom (PTZ) camera device over at least one network, the computer terminal including:
      at least one input device to receive input from a user of the computer terminal;
      communication circuitry configured to transmit a command, destined to be received by the PTZ camera device and to effect eventual camera movement thereof, over the at least one network;
      a processor configured to:
         generate the command, specific to the user input, that defines a camera movement for making a change in a Field Of View (FOV) of the PTZ camera device;
         in a period of time overlapping with transmission of the command by the communication circuitry, locally transform video frames to emulate future video frames produced, post-command execution, by the PTZ camera device, wherein the future video frames being emulated are not used in the local transforming of the video frames; and
         repeatedly check frames, received at the computer terminal via the at least one network, until a determination is made that a newly received frame indicates that the local transforming of the video frames is no longer needed; and
      a display configured to display the locally transformed frames.

7. The apparatus as claimed in claim 6 wherein the display is a touchscreen display and the at least one input device comprises one or more defined regions of the touchscreen display.

8. The apparatus as claimed in claim 6 wherein:
   the locally transformed video frames do not include image data for certain defined regions to be displayed, and
   the defined regions have placeholder data inserted therein.

9. The apparatus as claimed in claim 6 further comprising the PTZ camera device, the at least one network and a server system communicatively coupled between the computer terminal and the PTZ camera device.

10. The apparatus as claimed in claim 9 wherein the server system is remote from the computer terminal and the PTZ camera device is remote from the server system.

11. A method carried out on a computer terminal that includes a display and at least one input device, the computer terminal in communication with at least two camera devices, including at least one Pan-Tilt-Zoom (PTZ) camera device, over at least one network, and the method comprising:
   receiving user input provided through the input device;
   determining that the user input specifies a command that defines a camera movement for changing a Field Of View (FOV) of the PTZ camera device from a current FOV to a future FOV, the future FOV including an FOV region not a part of the current FOV but covered by a current FOV of another of the at least two camera devices;
   emulating a future video frame corresponding to the future FOV of the PTZ camera device by mosaicking image data from the PTZ camera device with image data from the another of the at least two camera devices; and displaying the emulated future video frame on the display before any video frames corresponding to the future FOV as generated by the PTZ camera device, post-command execution, are available to the computer terminal.

12. The method as claimed in claim 1 wherein the computer terminal is a laptop computer.

13. The method as claimed in claim 1 wherein the at least one network includes a local area network and a wide area network.

14. The method as claimed in claim 1 wherein the computer terminal includes a wireless transceiver employed in the transmitting of the command.

15. The method as claimed in claim 1 wherein the computer terminal includes a network interface card employed in the transmitting of the command.

16. The apparatus as claimed in claim 6 wherein the computer terminal is a laptop computer.

17. The apparatus as claimed in claim 6 wherein the at least one network includes a local area network and a wide area network.

18. The apparatus as claimed in claim 6 wherein the computer terminal includes a wireless transceiver employed in the transmitting of the command.

19. The apparatus as claimed in claim 6 wherein the computer terminal includes a network interface card employed in the transmitting of the command.

* * * * *